(12) United States Patent
Fedeson et al.

(10) Patent No.: US 8,261,702 B2
(45) Date of Patent: Sep. 11, 2012

(54) INTERNAL COMBUSTION ENGINE WITH DIRECT COOLING OF CYLINDER COMPONENTS

(75) Inventors: Ken Steven Fedeson, Farmington Hills, MI (US); Jody Michael Slike, Farmington Hills, MI (US); Theodore Beyer, Canton, MI (US)

(73) Assignee: Ford Global Technologies, Dearborn, MI (US)

( * ) Notice: Subject to any disclaimer, the term of this patent is extended or adjusted under 35 U.S.C. 154(b) by 636 days.

(21) Appl. No.: 12/492,197

(22) Filed: Jun. 26, 2009

(65) Prior Publication Data
US 2010/0326380 A1 Dec. 30, 2010

(51) Int. Cl.
*F02F 1/36* (2006.01)

(52) U.S. Cl. ................. 123/41.82 R; 277/592

(58) Field of Classification Search ........... 123/41.82 R; 277/592
See application file for complete search history.

(56) References Cited

U.S. PATENT DOCUMENTS

| 4,211,205 A | 7/1980 | Lockhart |
| 4,683,844 A | 8/1987 | Arai et al. |
| 4,944,265 A | 7/1990 | Davey |
| 5,267,740 A | 12/1993 | Stritzke |
| 5,853,175 A | 12/1998 | Udagawa |
| 6,588,766 B2 | 7/2003 | Shattuck |
| 6,786,490 B2 | 9/2004 | Fujino et al. |
| 6,901,891 B2 | 6/2005 | Suzuki et al. |
| 7,044,099 B2 | 5/2006 | Gorgas et al. |
| 7,152,571 B1 | 12/2006 | Wilson et al. |
| 2002/0024183 A1 | 2/2002 | Thompson |
| 2008/0245613 A1 | 10/2008 | Rutschmann et al. |

FOREIGN PATENT DOCUMENTS

| DE | 4117112 C1 * | 6/1992 |
| EP | 2050990 A1 | 4/2009 |
| JP | 10103522 A * | 4/1998 |
| KR | 2002054043 A * | 7/2002 |
| WO | WO2007/096032 A1 | 8/2007 |

* cited by examiner

*Primary Examiner* — Noah Kamen
(74) *Attorney, Agent, or Firm* — Jerome R. Drouillard; Julia Voutyras

(57) ABSTRACT

A multicylinder internal combustion engine includes a cylinder block, a cylinder head and a gasket mounted between the cylinder block and cylinder head. A coolant passage extends through the cylinder block and laterally along an uppermost portion of a shared cylinder wall extending between adjacent engine cylinders. The laterally extending cooling passage is defined at least in part by a passage formed in the cylinder head gasket.

3 Claims, 4 Drawing Sheets

INTERNAL COMBUSTION ENGINE WITH DIRECT COOLING OF CYLINDER COMPONENTS

BACKGROUND OF THE DISCLOSURE

1. Field of the Disclosure

The present disclosure relates to an internal combustion engine having a coolant path extending along the common walls of adjacent cylinders.

2. Related Art

The ability to control internal combustion engine operating temperatures is crucially important to the promotion of long engine life and the control of exhaust emissions. As engines become increasingly more compact, more engines are, and will be, produced with so-called "siamesed" cylinders in which adjacent cylinders are located so close to one another that there is no space available for a water jacket between the adjacent cylinders. As a result, the metal temperature may greatly increase in this so-called "bridge area" of the cylinder block, which may adversely effect longevity, as well as under certain cases, fuel economy and exhaust emissions. Although it is known to provide special cooling passages, such as those produced by saw cutting, through the bridge area, such passages require additional machining operations which are costly because of increased tooling, labor, and even scrappage.

It would be desirable to provide an engine cooling system in which coolant is directed specifically to the bridge area between adjacent cylinders without the need for additional machining operations in the bridge area.

SUMMARY OF THE DISCLOSURE

According to an aspect of the present disclosure, a multi-cylinder internal combustion engine includes a cylinder block with at least one shared cylinder wall, and a cylinder head mounted to the cylinder block. A gasket which is mounted between the cylinder block and the cylinder head acts in concert with the cylinder block and head to define a cooling passage extending through a deck surface of the cylinder block and laterally along an uppermost portion of the shared cylinder wall and then into the cylinder head, with a lateral portion of the passage being defined in part by the gasket.

According to another aspect of the present disclosure, a cylinder head gasket which extends along the uppermost portion of the shared cylinder wall includes a bottom layer having an inlet port for admitting coolant flowing from the cylinder block into the coolant passage, a top layer having an outlet port permitting coolant to flow into the cylinder head from the coolant passage, and a middle layer having a slot extending along the shared cylinder wall and corresponding to the lateral portion of the coolant passage, with the slot being in fluid communication with the inlet port and the outlet port.

According to another aspect of the present disclosure, the top and bottom layers of the gasket may have slots which are at least partially coextensive with the slot within the middle, or spacer, layer, so as to allow coolant flowing through the coolant passage to contact either or both of the cylinder head and the shared cylinder wall. Alternatively, neither the top, nor the bottom layers may be slotted, so that coolant does not come in direct contact with either the cylinder head or the shared cylinder wall.

It is an advantage of an internal combustion engine with direct cooling of cylinder components according to this disclosure that engine life and emissions control are subject to a beneficial impact.

It is an advantage of an internal combustion engine with direct cylinder deck cooling according to the present disclosure that an engine may be operated with higher specific output without deleterious effects from excessive heating.

Other advantages, as well as features of the present system, will become apparent to the reader of this specification.

DETAILED DESCRIPTION OF THE PREFERRED EMBODIMENTS

Figure 1:
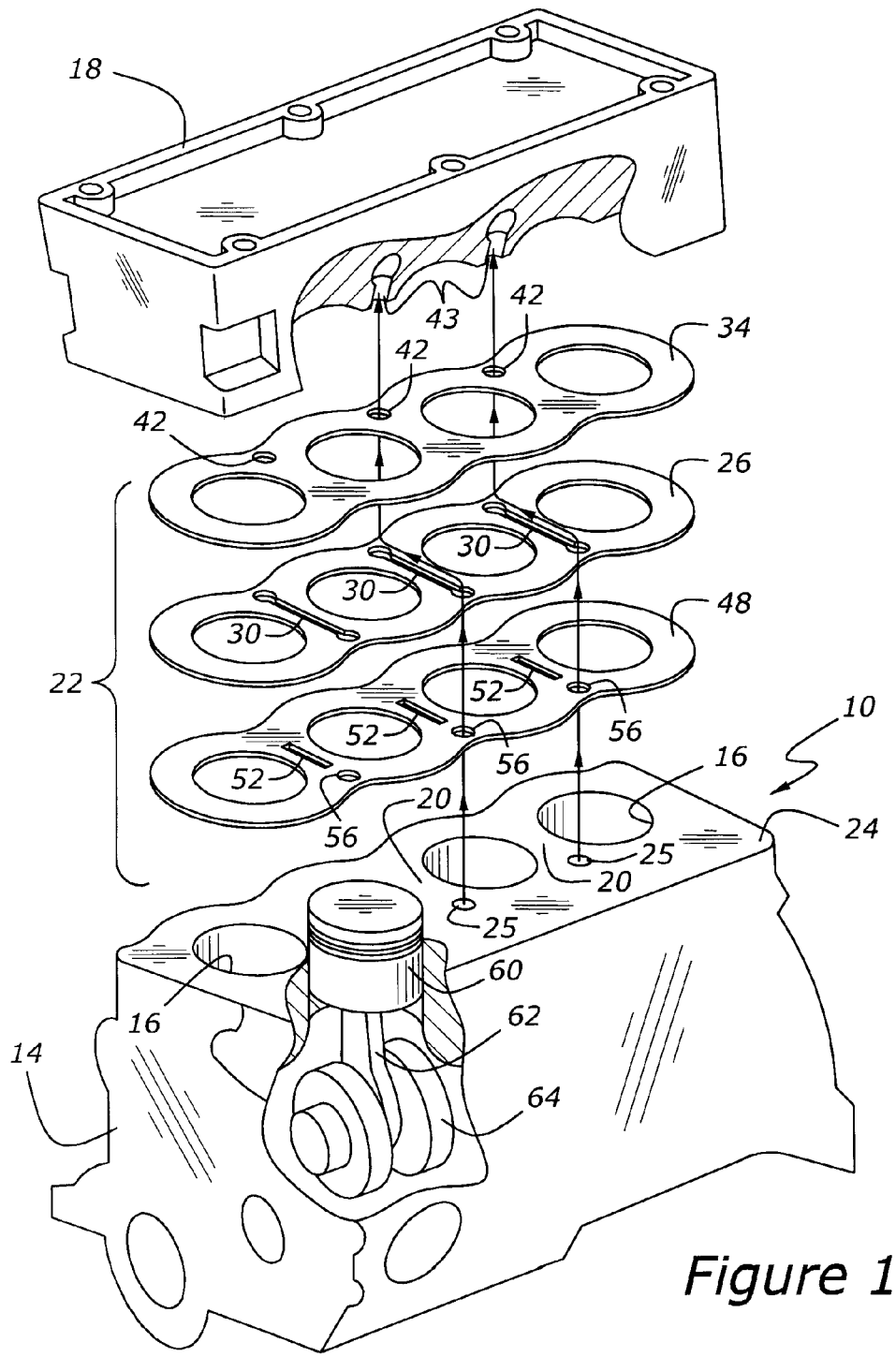
FIG. 1 is a partially schematic representation of an engine having a cooling system according to an aspect of the present disclosure.

As shown in FIG. 1, engine 10 has a cylinder block, 14, with a number of cylinders 16, configured therein. Cylinders 16 have a number of shared cylinder walls 20, extending between adjacent cylinders. These cylinders 16 are of the so-called "siamesed" type, because coolant does not flow between adjacent cylinders. This allows shared cylinder wall 20 to achieve a high level of heating during operation of engine 10. The engine also includes a cylinder head 18, which, along with cylinder block 14, sandwiches a cylinder head gasket, 22.

Figure 2:
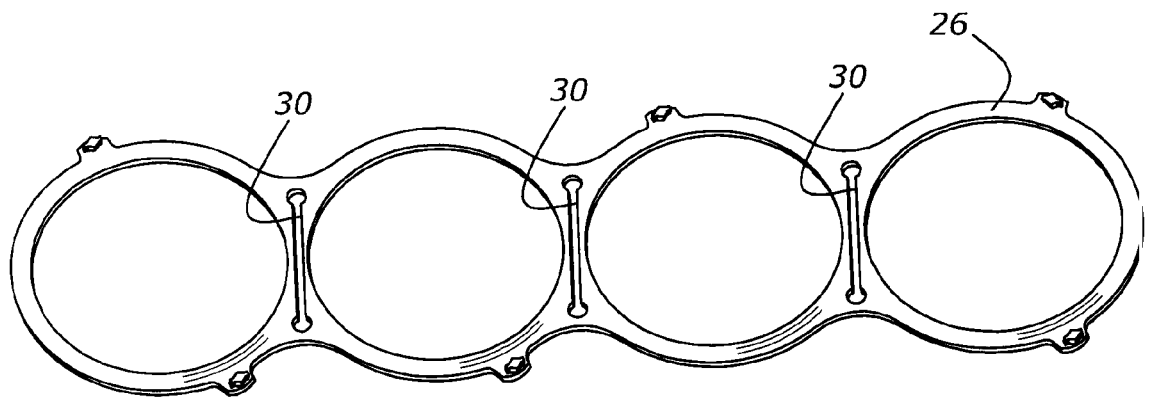
FIG. 2 shows a middle, or insert, portion of a gasket according to an aspect of the present disclosure.

FIGS. 1 and 2 show that middle, or spacer, portion, 26, of cylinder head gasket 22 has a number of slots, 30, which help to define a coolant passage extending across a shared cylinder wall 20 between adjacent ones of engine cylinders 16. In general, coolant flows up through ports 25 formed in deck surface 24 of cylinder block 14, and then through slots 30, before flowing upwardly into ports 43 formed in cylinder head 18.

Figure 3:
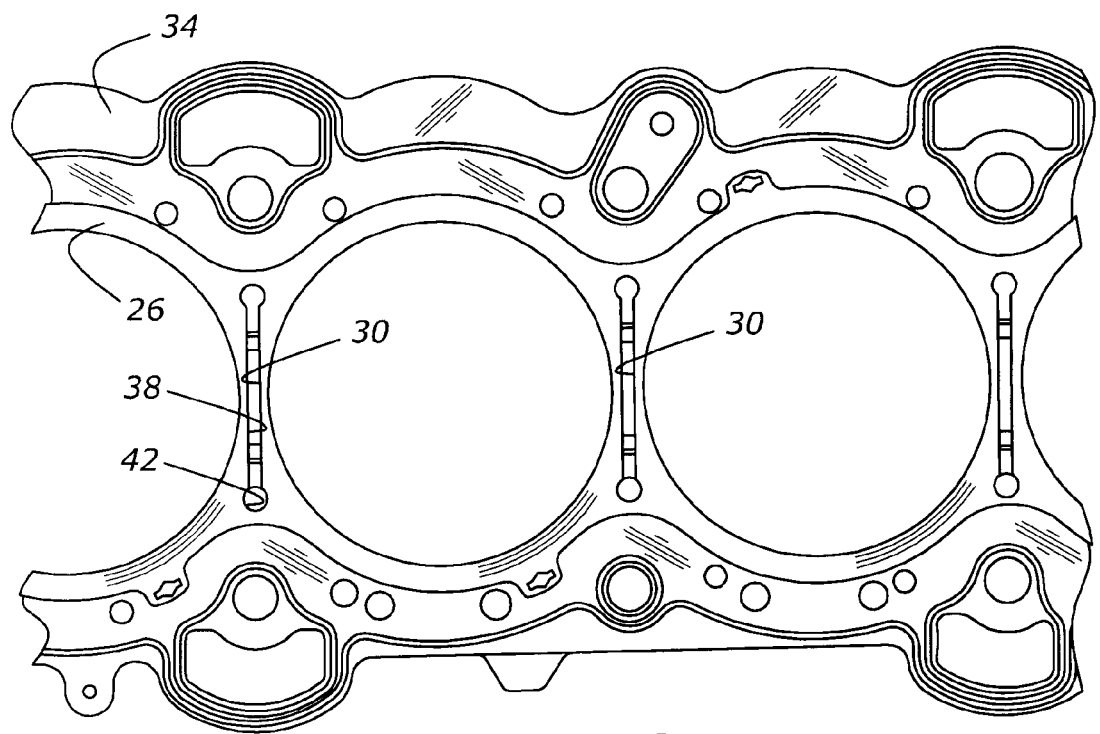
FIG. 3 is a plan view of a partially assembled gasket according to an aspect of the present disclosure.

FIG. 3 illustrates spacer 26 after upper layer 34 has been joined thereto. It is noted that upper layer 34 has a number of ports 42, for allowing coolant to pass into cylinder head ports 43 once the coolant moves through the passages defined by slots 30, which are formed in spacer or middle layer 26, and slots 38, which are formed in top layer 34.

Figure 4:
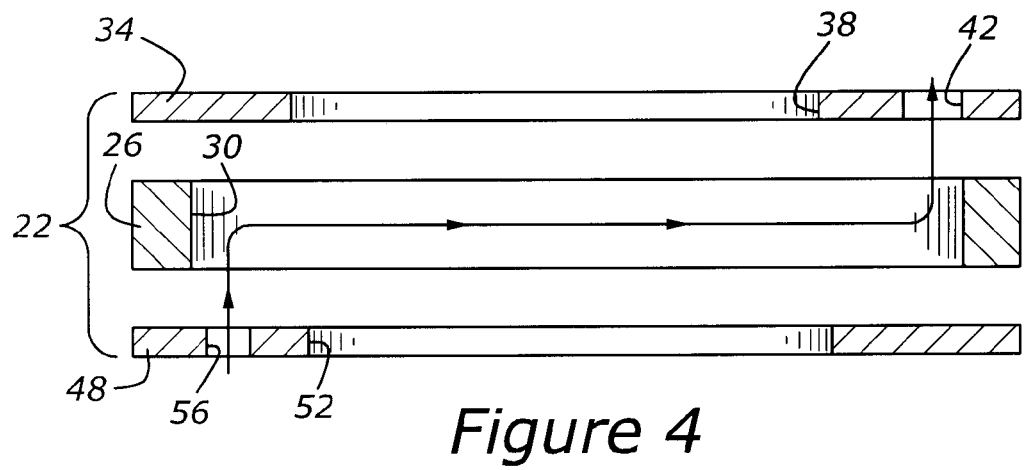
FIG. 4 is a section of a gasket taken along a shared cylinder wall, with the gasket having slots through both the top and bottom layer.

FIG. 4 shows a first configuration for gasket 22 in which cooling slot 30 formed in middle layer 26 is at least partially coextensive with a slot, 38, formed in top layer 34, as well as with a slot, 52, formed in bottom layer 48, so as to allow coolant which flows upwardly through port 56 formed in bottom layer 48, to flow across shared cylinder wall 20, such that the coolant is confined by cylinder head 18 at an upper portion of the coolant passage and shared cylinder wall 20 at the lower portion of the coolant passage, with the coolant then flowing out through port 42 formed in top layer 34. In other words, the coolant is allowed to freely impinge upon both cylinder block 14 in the area of shared cylinder wall 20, and cylinder head 18 in the same area.

Figure 5:
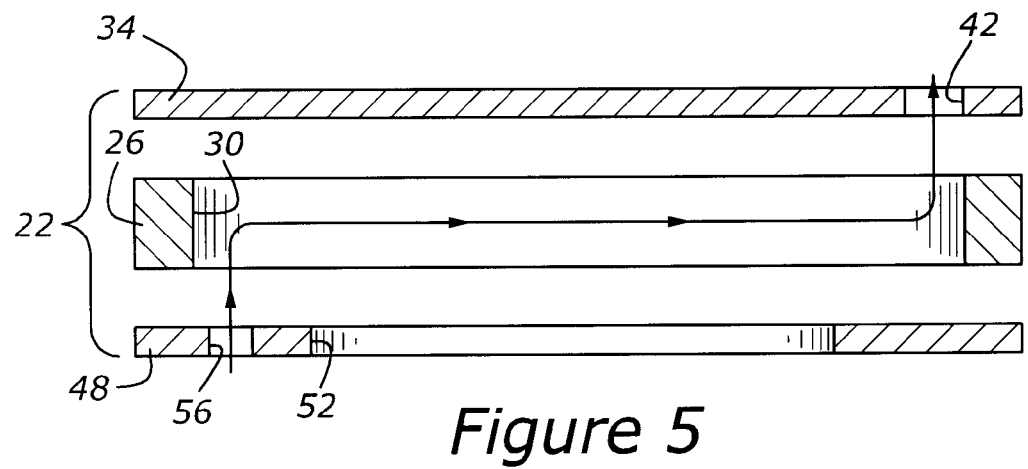
FIG. 5 shows a gasket similar to that shown in FIG. 4, but having a slot extending only through the lower, or bottom, layer.
Figure 6:
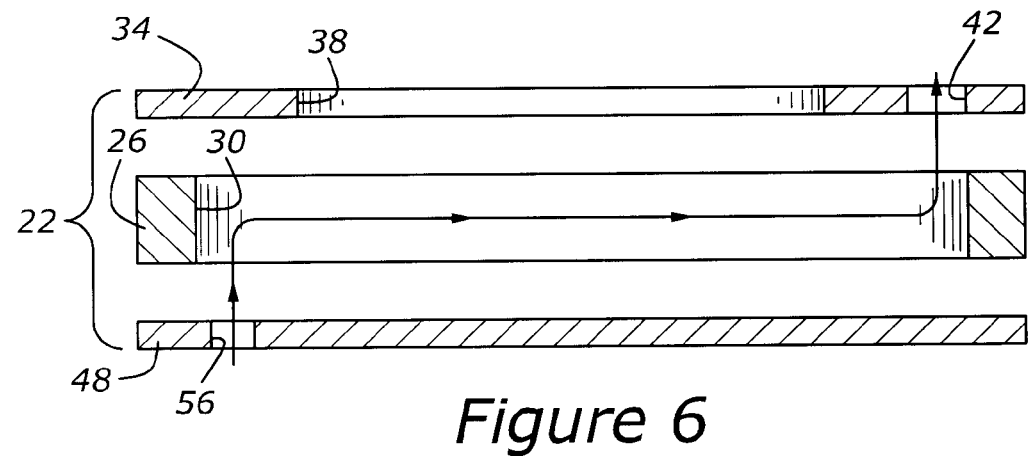
FIG. 6 is similar to FIGS. 4 and 5, but shows a gasket having a slot through only the top layer.

In the embodiment of FIG. 5, no slot is formed in top layer 34, with the result being that coolant is allowed by virtue of slot 52 formed in bottom layer 48, to directly contact shared cylinder wall 20, but not cylinder head 18. Conversely, in the embodiment illustrated in FIG. 6, coolant is allowed, by virtue of slot 38, to contact cylinder head 18, but because there is no slot within bottom layer 48, coolant is not allowed to directly contact or impinge upon shared cylinder wall 20. Rather, the embodiment of FIG. 6 relies upon conductive heat transfer, rather than convective heat transfer, to cool cylinder block 14.

Figure 7:
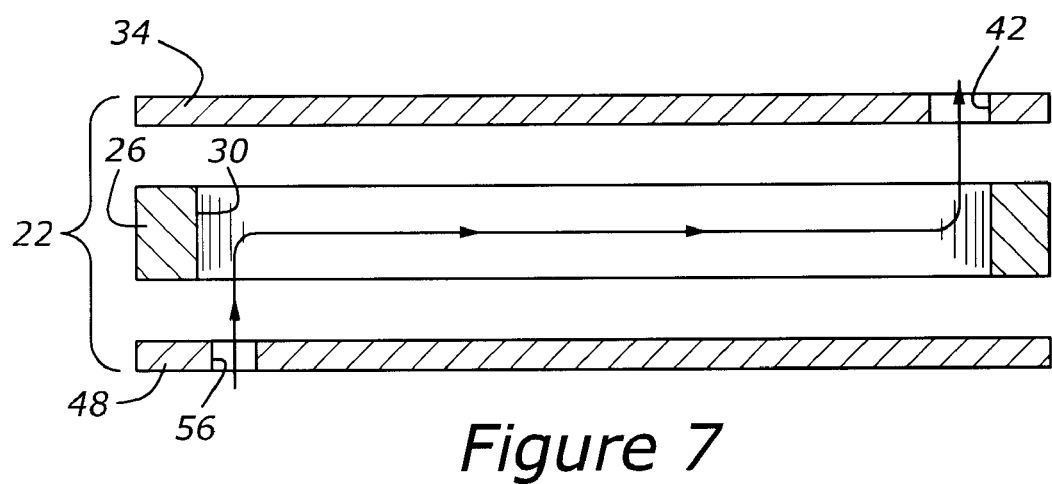
FIG. 7 is similar to FIGS. 4-6, but shows a gasket having no slot in either the top layer or the bottom layer.

In the embodiment of FIG. 7, neither top layer 34, nor bottom layer 48, has a slot, with the result being that the only convective heat transfer occurs between coolant flowing through slot 30, and top layer 34, or bottom layer 48, with the heat transfer from cylinder head 18 and cylinder block 14 being a matter of conductive heat transfer. The embodiment of FIG. 7 provides a structure which may be more robust in terms of its longevity in an operating engine.

The foregoing system has been described in accordance with the relevant legal standards, thus the description is exemplary rather than limiting in nature. Variations and modifications to the disclosed embodiments may become apparent to those skilled in the art and fall within the scope of the disclosure. For example, an engine according to the present disclosure could incorporate a cylinder head gasket having more than three layers, with the additional layers providing features other than those described herein. Accordingly the scope of legal protection can only be determined by studying the following claims.

What is claimed is:

1. A multicylinder internal combustion engine, comprising:
   a cylinder block with at least one shared cylinder wall;
   a cylinder head mounted to said cylinder block;
   a gasket mounted between said cylinder block and said cylinder head; and
   a coolant passage extending through said cylinder block and laterally along an uppermost portion of said shared cylinder wall and then into said cylinder head, with said lateral portion of said passage being defined in part by said gasket with said gasket comprising:
      a bottom layer having an inlet port for admitting coolant flowing from said cylinder block into said coolant passage;
      a top layer having an outlet port permitting coolant to flow into said cylinder head from said coolant passage; and
      a middle layer having a slot extending along said shared cylinder wall and corresponding to said lateral portion of said coolant passage, with said slot being in fluid communication with said inlet port and said outlet port, wherein said bottom layer of said gasket has a slot which is at least partially coextensive with the slot within said middle layer, whereby coolant flowing through said coolant passage is allowed to contact the shared wall of the cylinder block.

2. A multicylinder internal combustion engine according to claim 1, wherein said bottom layer of said gasket and said top layer of said gasket each has a slot which is at least partially coextensive with the slot within said middle layer, whereby coolant flowing through said coolant passage is allowed to contact both the shared wall of the cylinder block as well as a portion of the cylinder head overlying said shared cylinder wall.

3. A multicylinder internal combustion engine, comprising:
   a cylinder block with at least one shared cylinder wall extending between adjacent cylinder bores;
   a cylinder head mounted to said cylinder block;
   a gasket mounted between said cylinder block and said cylinder head; and
   a coolant passage extending upwardly from a deck surface of said cylinder block and along an uppermost portion of said shared cylinder wall and then upwardly into said cylinder head, with said portion of said passage extending along said shared cylinder wall being defined by said gasket, as well as by said cylinder head and said cylinder block, with said gasket comprising:
      a bottom layer in contact with said cylinder block, and having an inlet port for admitting coolant flowing from said cylinder block into said coolant passage, and a slot extending for at least a portion of the length of said coolant passage which extends along said uppermost portion of said shared cylinder wall, so that coolant flowing through the coolant passage will impinge upon said shared cylinder wall;
      a top layer in contact with said cylinder head, and having an outlet port permitting coolant to flow into said cylinder head from said coolant passage, and a slot extending for at least a portion of the length of said coolant passage which extends along said uppermost portion of said shared cylinder wall, so that coolant flowing through the coolant passage will impinge upon said cylinder head; and
      a middle layer having a slot extending along said shared cylinder wall between said inlet port and said outlet port.

* * * * *